United States Patent [19]
Quinn et al.

[11] Patent Number: 5,813,591
[45] Date of Patent: Sep. 29, 1998

[54] SOLDER FEEDER

[76] Inventors: David L. Quinn, 3506 Meadow La.; Kevin M. Quinn, 2606 Fontana Dr., both of Glenview, Ill. 60025

[21] Appl. No.: 761,445

[22] Filed: Dec. 6, 1996

[51] Int. Cl.⁶ ........................................................ B23K 3/06
[52] U.S. Cl. ............................. 228/41; 228/244; 226/127
[58] Field of Search .................................. 228/33, 41, 52, 228/244; 226/127, 128, 129, 158; 219/230

[56] References Cited

U.S. PATENT DOCUMENTS

| | | |
|---|---|---|
| 3,101,689 | 8/1963 | Hammond et al. . |
| 3,198,415 | 8/1965 | Taylor . |
| 3,852,565 | 12/1974 | Kager ........................................ 226/128 |
| 4,411,379 | 10/1983 | Gravel ........................................ 228/52 |
| 4,793,541 | 12/1988 | Dravnieks .................................. 228/52 |
| 5,421,505 | 6/1995 | Hild, II . |

*Primary Examiner*—Samuel M. Heinrich
*Attorney, Agent, or Firm*—Trexler, Bushnell, Giangiorgi & Blackstone, Ltd.

[57] ABSTRACT

A solder dispenser which includes a body portion having a sleeve thereon with a moveable shuttle extending through the sleeve. A solder holder bracket is retained on the moveable shuttle for retaining a spool of solder on the solder dispsenser. A solder gripper is carried on the body for gripping solder upon moving the shuttle to extend a length of solder from the solder spool. The solder gripper acts as a one-way cam which retains the solder as it is being extending from the spool but also allows solder to pass therethrough once it is extended from the spool. A trigger assembly is used to displace the shuttle and thereby extend a length of solder. The trigger assembly allows for dispensing a selected or desired length of solder from the spool.

14 Claims, 5 Drawing Sheets

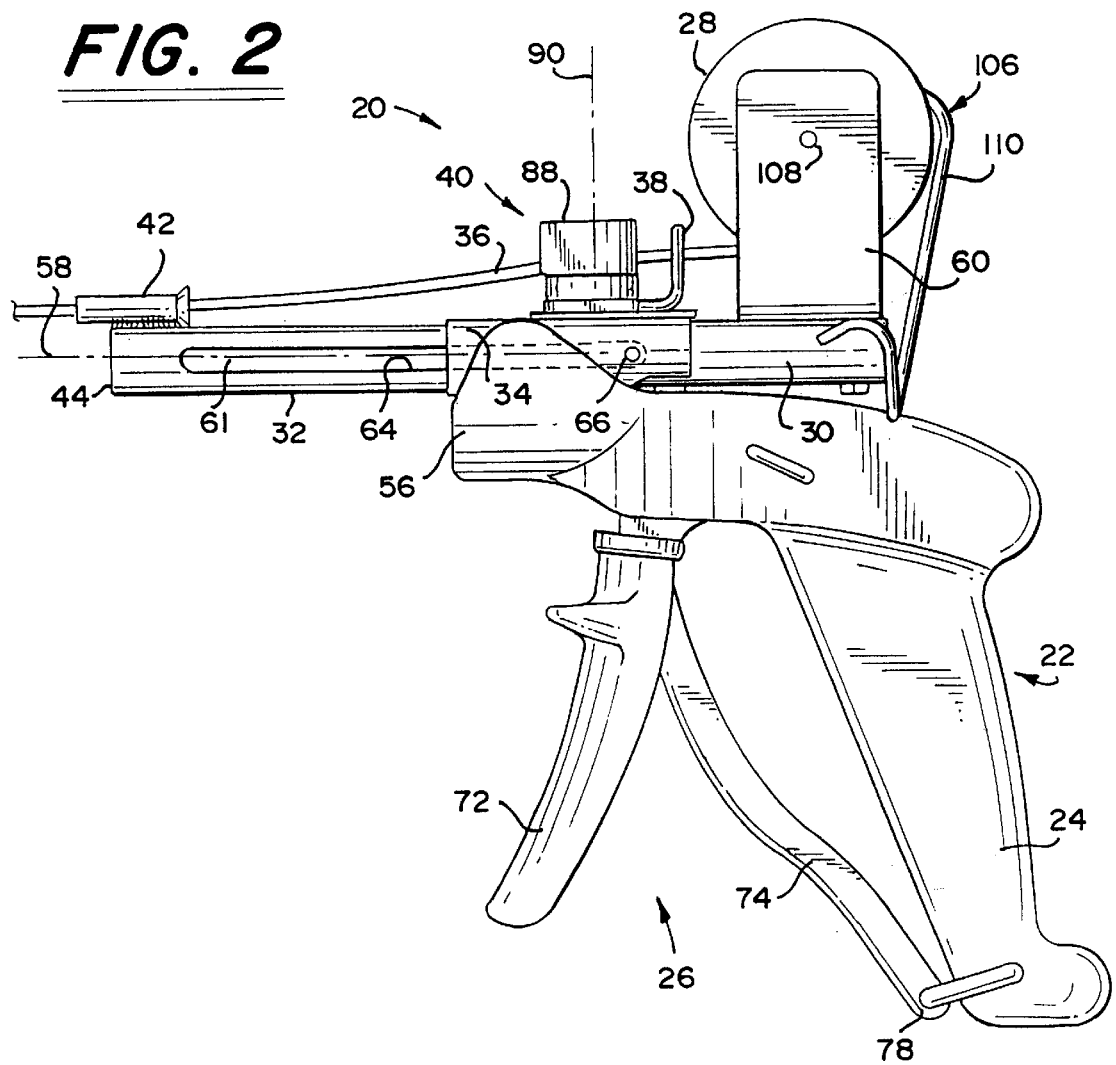
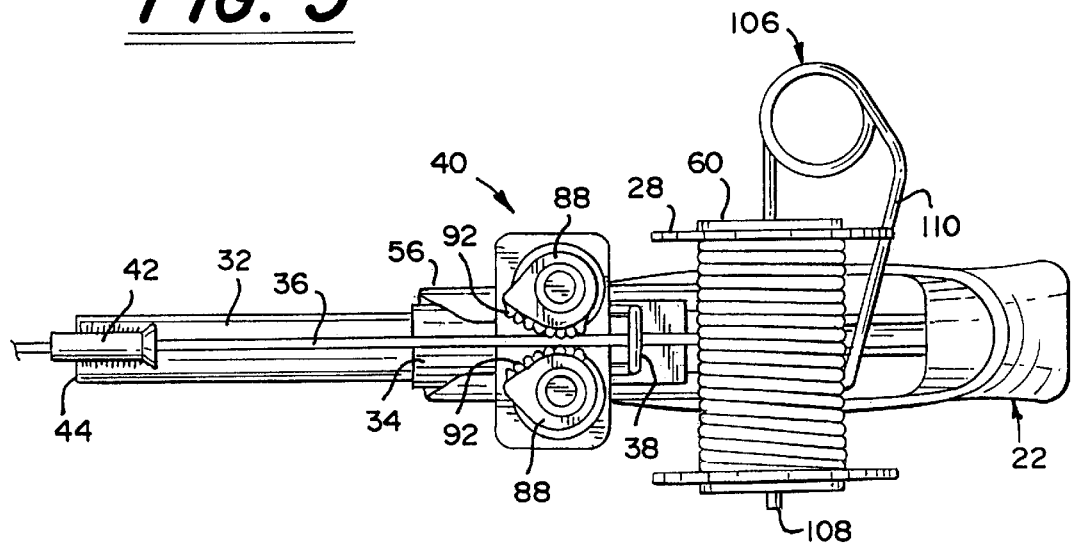

SOLDER FEEDER

BACKGROUND

The present invention relates to a device for dispensing or feeding solder from a roll of solder for use in soldering operations.

Solder is used in a number of joining operations in order to provide a desired connection or seal. An example of a common soldering operation is the soldering of pipe joints. Copper pipes are joined by a flared connection which is soldered to provide a connection and a seal at the flare. Using prior art techniques, a tradesman uncoils a length of solder from a solder spool. The tip of the extended length of solder is placed at the joint to be sealed and a heat source, typically a blow torch is applied thereto. As the solder melts from the extended length, it is placed at the joint in order to form the solder joint.

Naturally, the extended length is reduced during the soldering operation and, periodically, additional solder must be extended from the spool. Extending additional solder requires the tradesman to put down his blow torch so that he has a free hand in which to extend additional solder. Alternatively, the tradesman may try to uncoil additional solder using only one hand but this may result in kinking or bending the solder as well as extending too much or too little solder.

An additional problem arises such that if a tradesman needs to put his blow torch down to extend additional solder, the blow torch may cause safety problems. One safety problem that may occur is that the tradesman may be burned by the torch especially because the torch must be put down and picked up numerous times during any given group of soldering operations. Additionally, accidents have occurred when torches are placed too close to walls or other nearby structures such that the torch ignites the nearby structures. This problem is exacerbated by pipes being placed in small confined areas requiring the tradesman to work in a cramped environment thereby increasing the likelihood that the flame may contact a structure.

As such it will be desirable to provide a device which can be used to hold and extend solder from a solder spool. Prior art devices have attempted to provide such a device with limited success. Two devices are known which are used to dispense solder wire from a spool of solder, U.S. Pat. No. 5,421,505 issued Jun. 6, 1995 to Hild and U.S. Pat. No. 3,101,689 issued Aug. 27, 1963 to Hammond et al. The devices as shown in Hild and Hammond are complex mechanical devices which have blind solder feeding paths. In other words, the spool feeds a length of solder wire through a body portion for dispensing through a tipped portion distal the spool. In both devices, the solder is fed blindly along the solder feeding path through the body. If the solder becomes jammed inside the body, the body may need to be disassembled in order to free the jam. Additionally, the devices as shown in Hild and Hammond appear to be thin wall plastic constructions which may be subject to breakage especially in high use day-in, day-out tradesman applications.

It is believed that the devices as shown in Hild and Hammond are not sufficiently robust or easy to use in order to provide reliable continuous service in field operations for daily use by tradesman.

OBJECTS AND SUMMARY

A general object of the present invention is to provide a solder dispenser which dispenses a length of solder wire from a spool of solder retained thereon.

Another object of the present invention is to provide a solder dispenser which is easy to use, easy to thread solder wire therethrough and easy to remove damaged or misthreaded solder wire therefrom.

Yet another object of the present invention is to provide a solder dispenser which allows a tradesman to selectively dispense a length of solder wire to permit generally continuous soldering operations.

Briefly, and in accordance with the foregoing, the present invention envisions a solder dispenser which includes a body portion having a sleeve thereon with a moveable shuttle extending through the sleeve. A solder holder bracket is retained on the shuttle for retaining a spool of solder on the solder dispenser. A solder gripper is carried on the body for gripping solder upon moving the shuttle to extend a length of solder from the solder spool. The solder gripper acts as a one-way cam which retains the solder as it is being extending from the spool but also allows solder to pass therethrough once it is extended from the spool. A trigger assembly is used to displace the elongated body and thereby extend a length of solder. The trigger assembly allows for dispensing a selected or desired length of solder from the spool.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 2 is a side elevational view of the solder dispenser as shown in FIG. 1;

FIG. 3 is a top plan view of the solder dispenser as shown in FIG. 2;

DESCRIPTION

Figure 1:
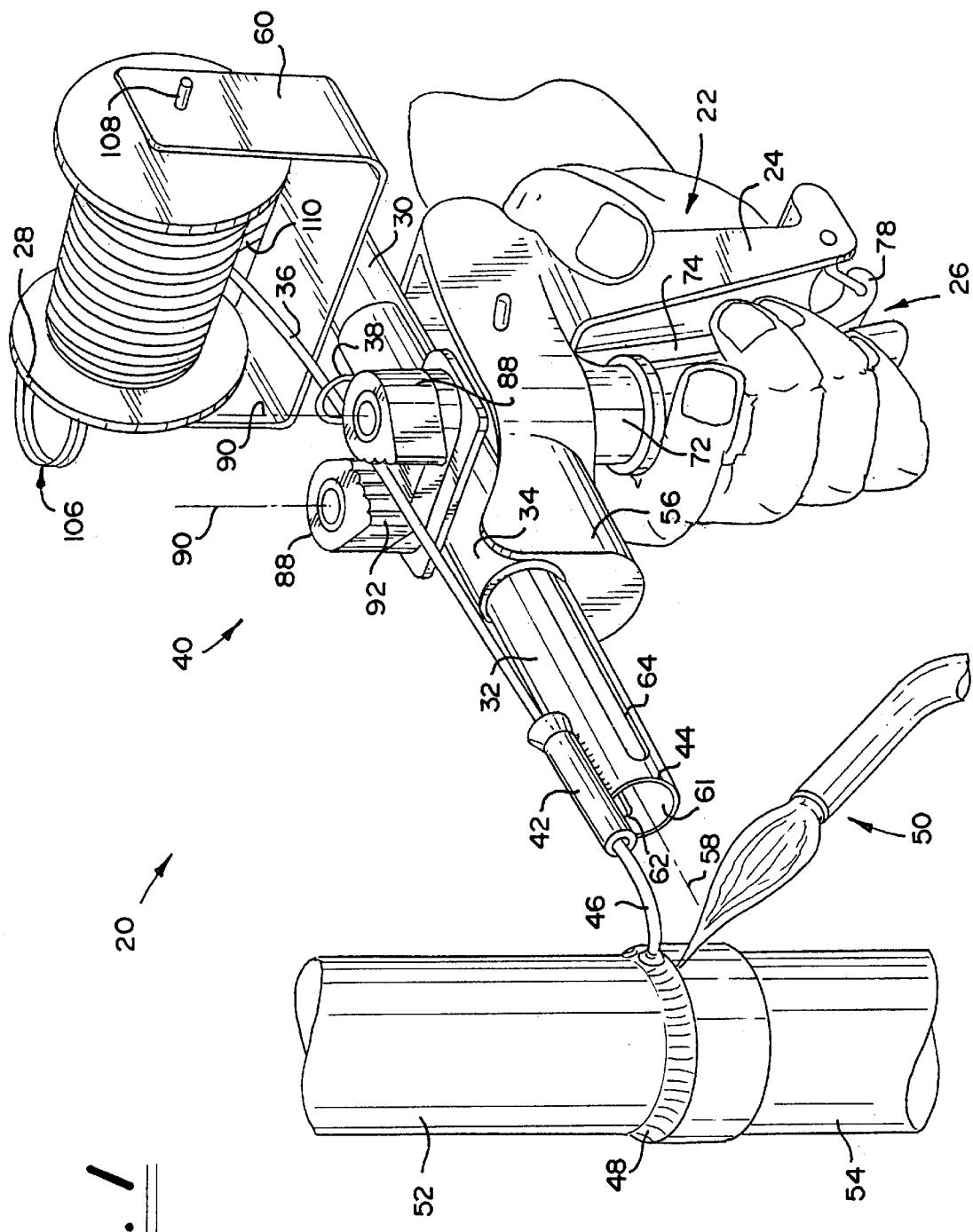
FIG. 1 is a perspective view of a solder dispenser of the present invention employed to apply solder to a joint on a pipe by means of a blow torch.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to FIG. 1, a solder dispenser 20 of the present invention is shown in use. The solder dispenser has a body 22 which includes a handle portion or handle 24 and a trigger assembly 26. A solder spool 28 is retained on a trailing end 30 of a shuttle 32. The shuttle 32 is slidably retained in a sleeve 34 attached to the body 22. Solder wire 36 extends from the spool 28 underneath a bail 38 and through a solder gripper assembly or gripper 40. Solder 36 extends from the solder gripper 40 and through a guide 42 on a leading end 44 of the shuttle 32. A tip portion 46 of solder extends from the guide 42 for use in soldering a joint 48 by use of a blow torch 50 to seal two pipes 52, 54.

Figure 4:
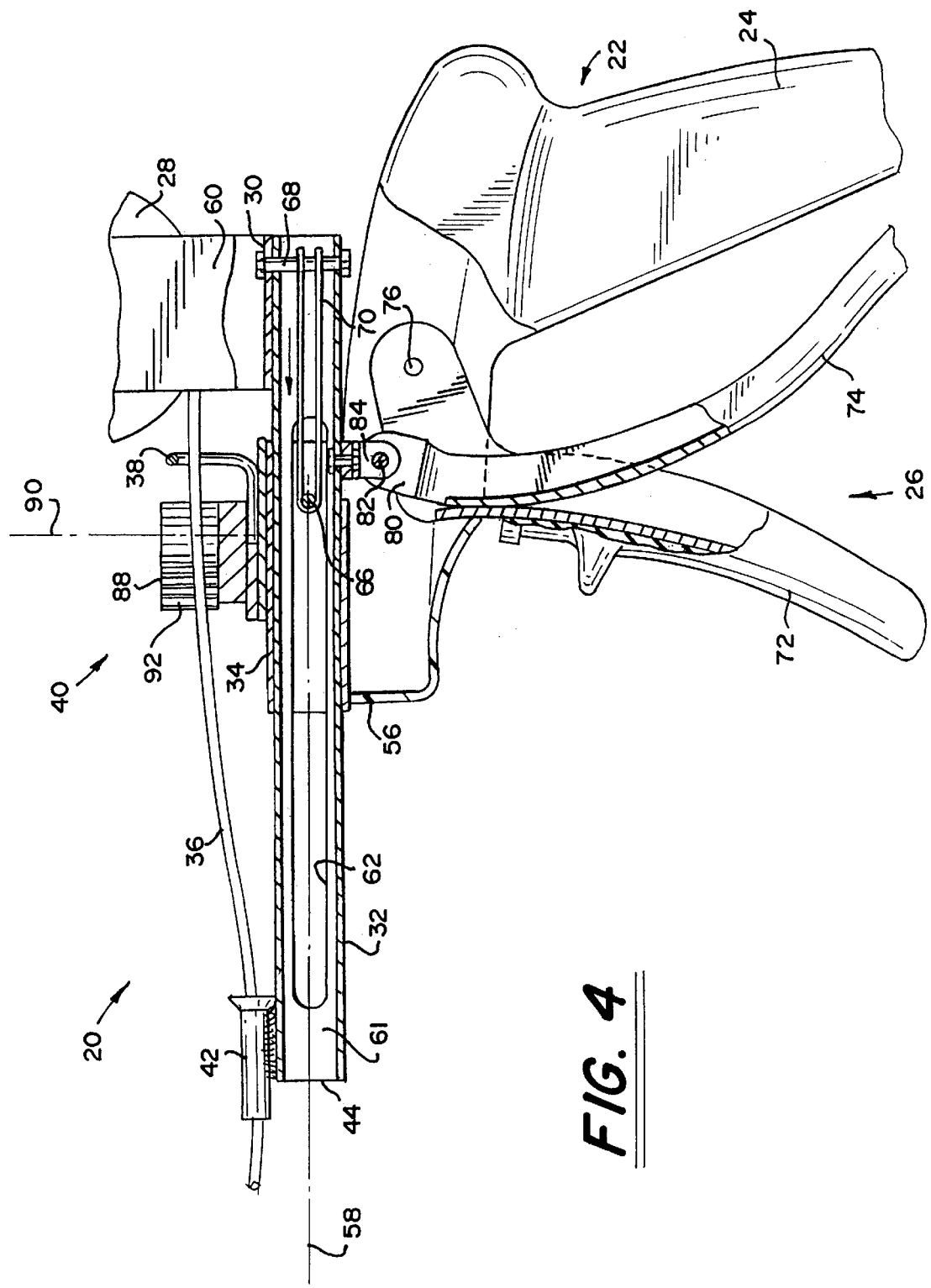
FIG. 4 is an enlarged, partial fragmentary, partial cross-sectional, side elevational view of the solder dispenser in a released or resting position.
Figure 5:
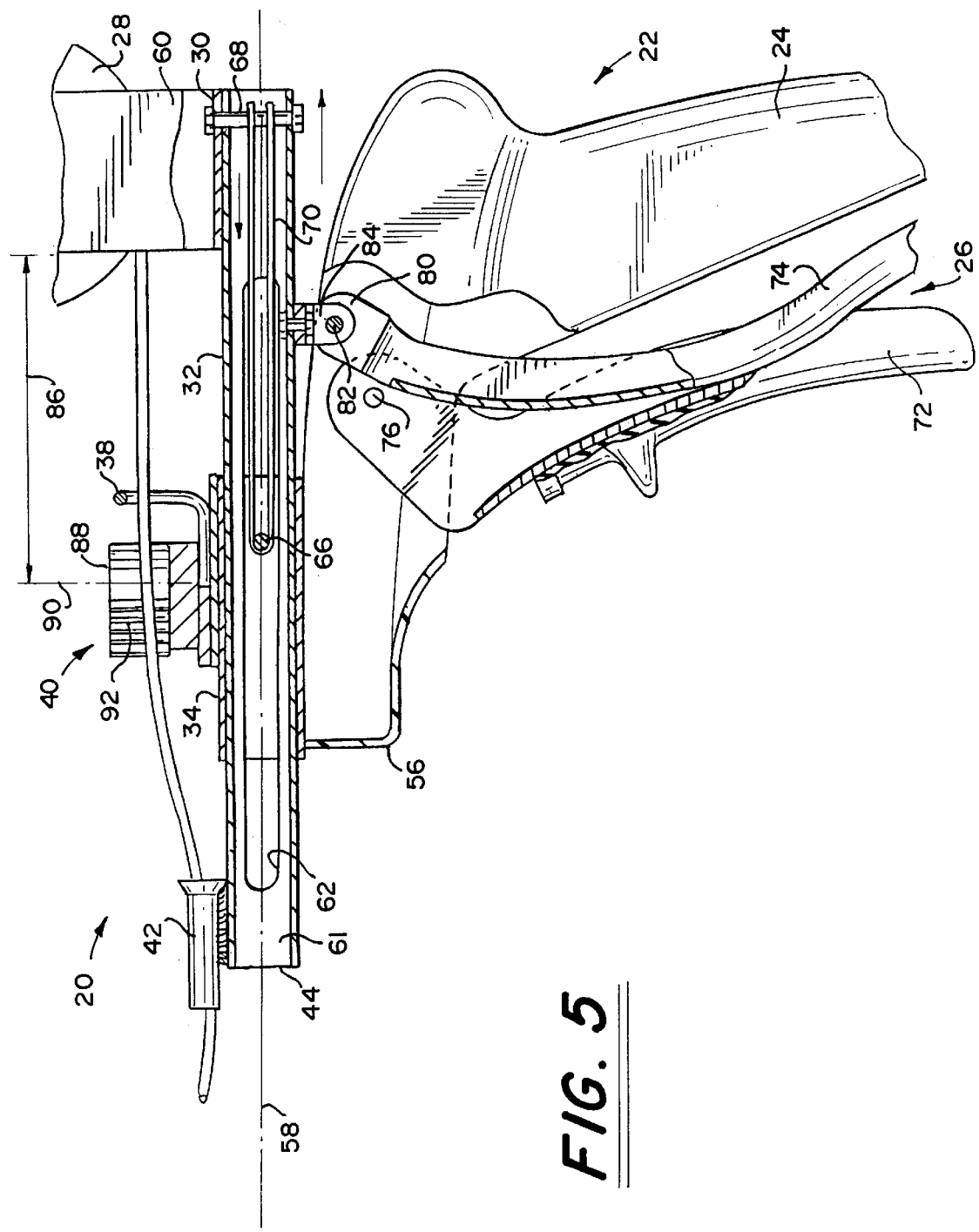
FIG. 5 is an enlarged, partial fragmentary, cross-sectional, side elevational view of the solder dispenser similar to that as shown in FIG. 4 in which a trigger assembly has been operated relative to a handle portion to displace a shuttle having a solder holder and solder spool retained thereon in order to extend a length of solder for use in soldering operations.

With further reference to FIGS. 1–5, the structure and function of the solder dispenser 20 of the present invention will be further discussed. As shown in FIG. 4, the solder dispenser 20 has been enlarged and portions broken away and shown in cross section in order to further illustrate the structure of the solder dispenser 20. As shown in FIG. 4, the solder dispenser 20 is in the static or relaxed condition. FIG. 5 shows the solder dispenser 20 in a cocked or activated position in order to extend a portion of solder.

With regard to FIG. 4, it can be seen that the sleeve 34 is attached to an upper portion 56 of the body 22. The sleeve 34 is fixed against movement to the upper portion 56. The shuttle 32, in the form of a generally tubular, elongated body, is positioned generally coaxial with the sleeve 34 and moves through the sleeve along a central axis 58. The spool 28 is retained on a solder holder 60 which is attached to the trailing end 30 of the shuttle 32. As such, the spool 28 moves away from and towards the gripper 40 as will be described in greater detail hereinbelow. In contrast, the gripper 40 is stationary relative to the body 32 and is attached to the sleeve 34. Likewise, the bail 38 is attached to the gripper 40 and/or sleeve 34.

The shuttle 32 is hollow, generally tubular body defining a cavity 61 therein as shown in the illustrated embodiment. It should be appreciated that only a partially hollow shuttle may be used, as well as shuttles of various other designs to achieve the claimed invention and that the invention is not limited to a hollow tubular shuttle as shown. Two elongated apertures 62, 64 are formed on either side of the shuttle 32 and extend through the wall thereof Extending through the apertures 62, 64 and secured to the sleeve 34 is a first mounting pin 66. A second mounting pin 68 is attached to the trailing end 30 of the shuttle 32. As such, the first mounting pin 66 is stationary relative to the body 22 and the second mounting pin 68 travels with the shuttle 32.

A biasing spring 70 is attached at one end to the first mounting pin 66 and a second end to the second mounting pin 68. The spring 70 is held in tension so that in the static state as shown in FIG. 4 the spring 70 urges the trailing end 30 forwardly. When the shuttle 32 is moved rearwardly when the trigger assembly 26 is operated, the spring 70 is stretched thereby creating forces to draw the shuttle 32 back to the condition as shown in FIG. 4. The stretched spring 70 as shown in FIG. 5 is in the cocked position.

The trigger assembly 26 includes a trigger 72 and a lever arm 74. The trigger 72 is attached at a pivot point 76 to the upper portion 56 of the body 22. The lever arm 74 has a first end 78 which is retained relative to a lower portion of the handle 24. A second end or upper end 80 of the lever arm 74 is retained at a pivot point 82 on a bracket 84 secured to the shuttle 32. The solder dispenser 20 is designed to be held in a hand (see FIG. 1) such that the trigger 72 is urged towards the handle 24 in order to initiate dispensing of a length of solder from the spool 28. Movement of the trigger 72 towards the handle 24 forces the lever arm 74 rearwardly towards the handle 24 thereby driving the shuttle 32 attached to the lever arm 74 rearwardly. A maximum rearward movement condition of the shuttle 32 can be seen in FIG. 5 which has been referred to hereinabove as a "cocked" position.

During the movement of the shuttle 32 during a dispensing operation as initially described hereinabove, the trigger assembly 26 is operated in order to drive the shuttle 32 rearwardly. As the shuttle 32 is moved rearwardly, the solder gripper 40 retains the solder 36 held therebetween against the rearward movement. As such, solder is peeled, unrolled or otherwise extended from the spool 28 as the spool 28 moves rearwardly on the shuttle 32. In the maximum rearward position as shown in FIG. 5, a length 86 of solder has been pulled from the spool 28.

As the trigger assembly 26 is released, the spring 70 pulls the shuttle 32 forwardly thereby forces the length 86 of solder through the solder gripper 40. It should be noted that the solder gripper 40 as shown in FIGS. 1–5 includes a pair of one-way rotary cams 88. Each of the rotary cams 88 have an axis of rotation 90 which is generally perpendicular to the central axis 58 with each cam 88, 88 being spaced on either side of the central axis 58. As such, the solder 36 extends between gripping surfaces 92 of the cams 88, 88 generally parallel to the central axis 58. The cams are of a generally known configuration, such as is shown in U.S. Pat. No. 3,795,218 issued Mar. 5, 1974 to Merry. The cams 88,88 are spring biased so that the gripping surfaces 92 squeeze or grip the outside surface of the solder 36. The cams 88, 88 clamp the solder therebetween against rearward movement as the shuttle 32 is moved rearwardly. At any point during the operation of the trigger assembly 36, the trigger may be released thereby dispensing a desired length of solder. When the trigger assembly 26 is released, the cams 88,88 pivot outwardly to allow the solder 36 to slide forwardly along the central axis 58 and through the guide 42.

It should be noted that the present invention provides an open path for initially feeding the solder through the bail 38, cams 88, 88 and guide 42. This makes it easy for a tradesman to feed the solder through the open path. Additionally, the open path allow for easy visual inspection and prevents blind areas as are found in the prior art. The open path allows any kinks or bends to be quickly and easily sighted and removed as well as prevents the solder from being caught on internal surfaces as might occur with the prior art devices. The bail 38 helps position the solder 36 in proper alignment with the cams 88, 88 to assure that the solder passes between the cams 88,88.

Figure 6:
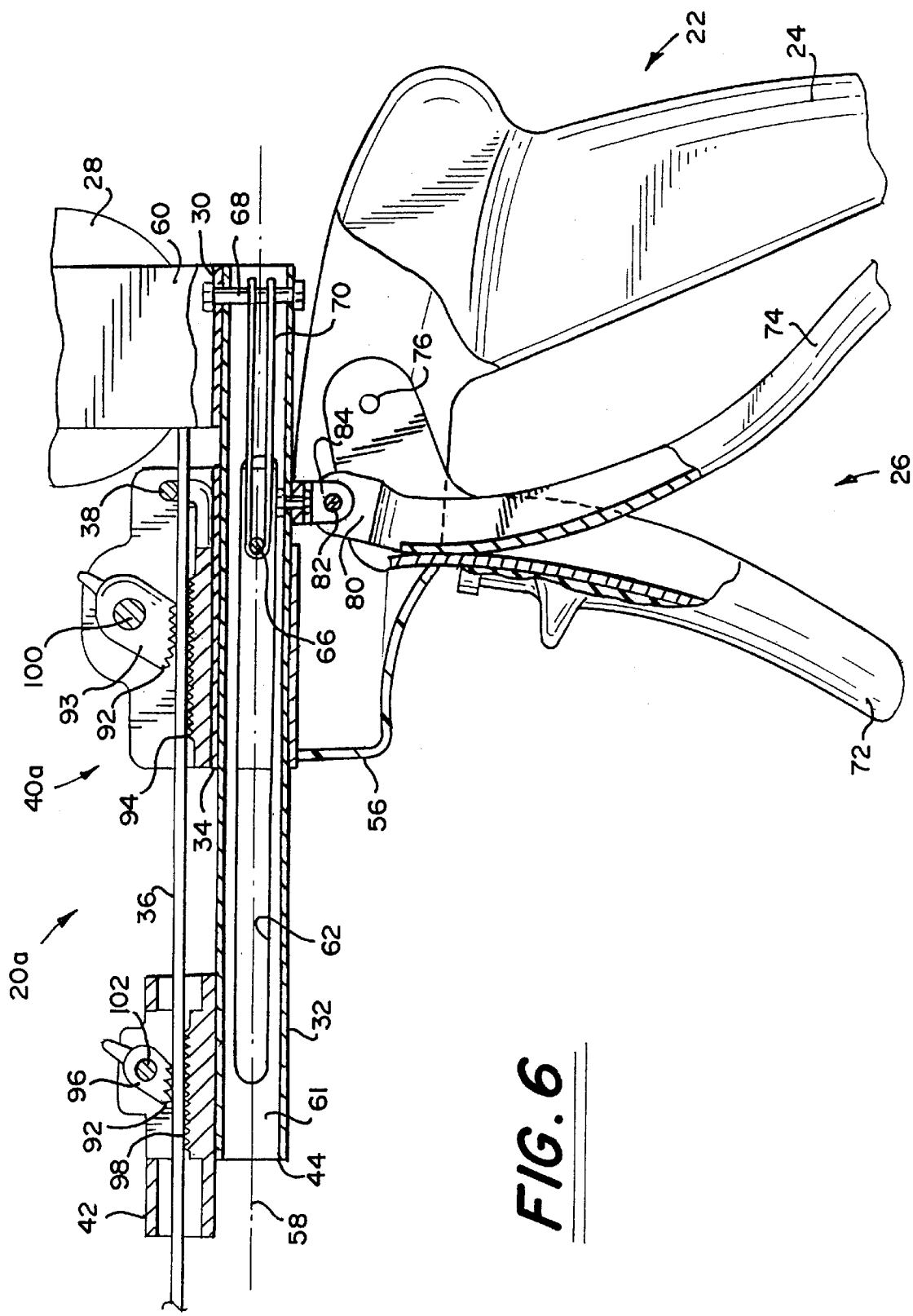
FIG. 6 is an enlarged, partial fragmentary, cross-sectional, side elevational view of a second embodiment of a solder dispenser similar to that as shown in FIGS. 1–5.

As shown in FIG. 6, an alternate embodiment of the solder dispenser 20a of the present invention is provided. The embodiment in FIG. 6 includes a gripper 40a having a single spring biased rotary cam 93 which is positioned opposite a stationary gripping surface 94. A bail 38 is provided to position the solder in alignment with cam 93 and gripping surface 94. An additional guide cam 96 is positioned at the leading end 44 of the shuttle 32 in a similar arrangement as the rotary cam 93 and gripping surface 94. The guide cam 96 is positioned in opposition to a second stationary gripping surface 98. Each of the cams 93, 96 have an axis of rotation 100, 102, respectively, which are perpendicular to the central axis 58. The solder is fed between the gripping surfaces 92 of the rotary cam 93 and the stationary gripping surface 94. The textured, rough or tooth surface of the gripping surface 92 and stationary gripping surface 94 retain the solder against rearward movement of the shuttle 32. The shuttle 32, and trigger assembly 26 operate in the identical manner as described hereinabove. The cams 93, 102 pivot forwardly and upwardly about the respective axis of rotation 100, 102 to allow the solder to slide forwardly as the shuttle 32 retracts forwardly under the influence of the spring 70. The dual cam and stationary cam construction as shown in FIG. 6 is preferable for fine gauge solder wire.

With reference to FIGS. 2 and 3, the spool 28 is retained on the holder 60 by a retaining pin 106. The retaining pin 106 has a shaft 108 which extends through the two spaced-apart portions of the solder holder 60 and the spool 28. A biased portion 110 extends to the opposite side to clip against and engage the shuttle. It is anticipated that various forms of solder holders 60 may be envisioned with the solder wire being deployed either in the fashion as shown in the illustration provided herein or with the spool 28 or a coil of solder being oriented 90 degrees relative to the orientation shown herein. Regardless of the orientation of the solder spool and the structure of the holder, it is envisioned that various modifications will be covered by the claims and description of the present invention.

In use, the solder dispenser 20 of the present invention is used by first loading a spool 28 into a solder holder 60 attached to the shuttle 32. A portion of solder 36 is threaded through the bail 38 and between the gripping surfaces 92, 92 of the cams 88, 88. The solder 36 is then threaded through the guide 42. The trigger assembly 26 is operated to drive the shuttle 32 rearwardly thereby extending a length 86 of solder. As the trigger assembly 26 is released, the length of solder drives through the cam which are pivoted outwardly relative to the corresponding axis of rotation 90. The length of solder 86 is then advanced through the guide 42 for use by the tradesman. Solder can be dispensed in a similar manner on demand using the maximum of length of solder or a desired length of solder which is less than the maximum. As such, the present invention provides solder on demand by activating the trigger assembly 26 in a desired length and in a convenient manner. Additionally, the present invention allows for easy and rapid loading of solder as well as visual inspection should solder become kinked during dispensing. The structure and operation of the present invention is quite robust and capable of handling the bumps and blows encountered in the construction field setting.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

The invention claimed is:

1. A solder dispenser comprising:
    a body having a handle thereon for holding said solder dispenser;
    a sleeve on said body having a central axis extending therethrough;
    a shuttle positioned in said sleeve for movement along said central axis, said shuttle having a front end and a trailing end;
    a trigger assembly carried on said body and attached to said shuttle for selectively displacing said shuttle along said central axis;
    a solder holder attached to said trailing end of said shuttle for retaining a spool of solder thereon;
    a guide attached to said front end of said shuttle distal said solder holder;
    a solder gripper for selectively gripping a portion of solder positioned therein, said solder gripper being attached to said body between said solder holder and said guide for resisting rearward motion of said solder position therein upon rearward motion of said shuttle along said central axis for extending a length of solder from said spool, said solder gripper allowing said extended length of solder to pass therethrough when said shuttle moves in a forward direction relative to said body to drive the extended solder through said guide for use in a soldering operation.

2. A solder dispenser as recited in claim 1, further comprising a spring attached to said shuttle and to said body for drawing said shuttle axially along said central axis to advance the length of solder extended from said spool.

3. A solder dispenser as recited in claim 2, further comprising:
    said shuttle being a generally and axially elongated tubular body defining a cavity therein, said shuttle having two axially elongated, spaced apart apertures extending generally parallel to said central axis;
    a first mounting pin attached to said sleeve and extending through said elongated apertures in said shuttle;
    a second mounting pin attached to said shuttle extending into said cavity of said elongated body;
    said spring being attached to said first and second mounting pin and retained internally in said bore of said shuttle.

4. A solder dispenser as recited in claim 1, said solder gripper further comprising:
    a pair of spring based cams having gripping surfaces on abutting portions thereof for gripping solder, said cams gripping solder placed therebetween when said shuttle is moved rearwardly and said cams allowing solder to pass therethrough when said shuttle is moved forwardly from a rearward position.

5. A solder dispenser as recited in claim 4, wherein said pair of spring biased cams have respective axes of rotation which are generally perpendicular to and spaced on either side of said central axis.

6. A solder dispenser as recited in claim 1, wherein said solder gripper includes a spring biased rotary cam having a gripping surface thereon in opposition with a stationary gripping surface for gripping solder therebetween said cam and stationary gripping surface holding solder therebetween when said shuttle is moved rearwardly and allowing solder to pass therebetween as said shuttle moves from the rearward position forwardly.

7. A solder dispenser as recited in claim 6, said solder gripper further comprising:
    a guide cam including a spring biased rotary cam in opposition to a second stationary gripping surface, said guide cam and said second stationary gripping surface being positioned proximate to said front end of said elongated body.

8. A solder dispenser as recited in claim 1, further comprising:
    a bail extending over a portion of solder between said solder holder and said solder gripper, said bail guiding said portion of solder from said spool of solder to said solder gripper.

9. A solder dispenser comprising:
    a body having a handle thereon;
    a sleeve on said body having a central axis extending therethrough;
    an elongated body disposed in said sleeve reciprocally displaceable along said central axis, said elongated body having a front end and a trailing end;
    a trigger assembly carried on said body and attached to said elongated body for controllably displacing said elongated body along said central axis;
    a solder holder attached to said trailing end of said elongated body for retaining a quantity of solder thereon;

a guide attached to said front end of said elongated body distal said solder holder;

a solder gripper attached to said body between said solder holder and said guide including a pair of spring biased cams having gripping surfaces on abutting portions thereof for gripping a portion of solder positioned therein and resisting rearward motion of said solder upon rearward displacement of said elongated body along said central axis to extend a length of solder from said quantity of solder and allowing an extended portion of solder to pass therethrough when said elongated body moves in a forward direction relative to said body to drive the extended portion of solder through said guide for use in the soldering operating; and a spring attached to said elongated body and to said body for drawing said elongated body axially along said central axis.

10. A solder dispenser as recited in claim 9, further comprising:

said elongated body defining a cavity therein and having two axially elongated, spaced apart apertures extending generally parallel to said central axis;

a first mounting pin attached to said sleeve and extending through said elongated apertures in said elongated body;

a second mounting pin attached to said elongated body extending into said cavity of said elongated body;

said spring being attached to said first and second mounting pin and retained internally in said bore of said elongated body.

11. A solder dispenser as recited in claim 9, wherein said pair of spring biased cams have respective axes of rotation which are generally perpendicular to and spaced on either side of said central axis.

12. A solder dispenser comprising:

a body having a handle thereon;

a sleeve on said body having a central axis extending therethrough;

an elongated body disposed in said sleeve reciprocally displaceable along said central axis, said elongated body having a front end and a trailing end;

a trigger assembly carried on said body and attached to said elongated body for controllably displacing said elongated body along said central axis;

a solder holder attached to said trailing end of said elongated body for retaining a quantity of solder thereon;

a guide attached to said front end of said elongated body distal said solder holder;

a solder gripper between said solder holder and said Stet. Said solder gripper including a spring biased rotary cam having a gripping surface thereon in opposition with a stationary gripping surface, a portion of solder extending between said spring biased rotary cam and said stationary gripping surface, said cam and stationary gripping surface gripping a portion of solder therebetween for resisting rearward motion of said solder upon rearward displacement of said elongated body along said central axis to extend a length of solder from said quantity of solder and allowing an extended portion of solder to pass therethrough when said elongated body moves in a forward direction relative to said body to drive the extended portion of solder through said guide for use in the soldering operation; and a spring attached to said elongated body and to said body for drawing said elongated body axially along said central axis.

13. A solder dispenser as recited in claim 12, further comprising:

said elongated body defining a cavity therein and having two axially elongated, spaced apart apertures extending generally parallel to said elongated body;

a first mounting pin attached to said sleeve and extending through said elongated apertures in said elongated body;

a second mounting pin attached to said elongated body extending into said cavity of said elongated body;

said spring being attached to said first and second mounting pin and retained internally in said bore of said elongated body.

14. A solder dispenser as recited in claim 13, said solder gripper further comprising:

a guide cam including a spring biased rotary cam in opposition to a second stationary gripping surface, said guide cam and said second stationary gripping surface being positioned proximate to said front end of said elongated body.

* * * * *